United States Patent
Van Den Bogaert

(10) Patent No.: US 10,085,178 B2
(45) Date of Patent: *Sep. 25, 2018

(54) DYNAMIC MOBILE APPLICATION QUALITY-OF-SERVICE MONITOR

(71) Applicant: EMPIRE TECHNOLOGY DEVELOPMENT LLC, Wilmington, DE (US)

(72) Inventor: Etienne A. H. Van Den Bogaert, Singapore (SG)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 15/489,111

(22) Filed: Apr. 17, 2017

(65) Prior Publication Data
US 2017/0223577 A1   Aug. 3, 2017

Related U.S. Application Data

(63) Continuation of application No. 13/003,235, filed as application No. PCT/SG2010/000354 on Sep. 20, 2010, now Pat. No. 9,629,012.

(51) Int. Cl.
*H04W 28/16* (2009.01)
*H04W 24/10* (2009.01)
(Continued)

(52) U.S. Cl.
CPC ........... *H04W 28/16* (2013.01); *H04L 43/062* (2013.01); *H04L 43/50* (2013.01);
(Continued)

(58) Field of Classification Search
CPC ..... H04W 28/18; H04W 24/10; H04W 24/00; H04L 12/26; H04L 41/0896;
(Continued)

(56) References Cited

U.S. PATENT DOCUMENTS 6,661,780 B2   12/2003   Li
7,324,523 B2   1/2008    Dacosta
(Continued)

OTHER PUBLICATIONS

Chen et al., "A QoS Dynamic Band with Partitioning (Q-DBP) Using Fermi-Utility Functions," 3rd International Network Conference of INC2002, pp. 1-8, (Jan. 2002).
(Continued)

*Primary Examiner* — Andrew Chriss
*Assistant Examiner* — Rasha Fayed

(57) ABSTRACT

Technologies are generally described for determining a quality-of-service of mobile applications. In some examples, a process for determining a quality-of-service of a mobile application executing on a mobile device coupled to a network includes collecting, by a mobile monitoring application (MMA), network usage measurements associated with multiple network communication sessions from a first network communication layer, wherein the multiple network communication sessions are conducted via the network and are associated with the mobile device. The process may also include evaluating, by the MMA, the collected network usage measurements to determine application-specific usage data associated with the mobile application, and determining, by the MMA, the quality-of-service of the mobile application based on the application-specific usage data.

24 Claims, 7 Drawing Sheets

(51) Int. Cl.
*H04W 24/02* (2009.01)
*H04W 36/00* (2009.01)
*H04W 52/36* (2009.01)
*H04L 12/26* (2006.01)
*H04L 12/857* (2013.01)

(52) U.S. Cl.
CPC ......... *H04L 47/2491* (2013.01); *H04W 24/02* (2013.01); *H04W 24/10* (2013.01); *H04W 36/0088* (2013.01); *H04W 52/365* (2013.01)

(58) Field of Classification Search
CPC ..... H04L 41/5025; H04L 43/08; H04L 43/16; H04L 47/10; H04L 47/11; H04L 47/22; H04L 47/32; H04L 47/125; H04L 47/2416; H04L 41/5019
USPC ........ 370/252; 709/203, 217, 223, 224, 201, 709/232, 239
See application file for complete search history.

(56) References Cited

U.S. PATENT DOCUMENTS

| | | | | |
|---|---|---|---|---|
| 7,916,659 B2* | 3/2011 | Loiacono | ................ | H04L 47/14 370/252 |
| 8,125,897 B2* | 2/2012 | Ray | .................... | H04L 41/0896 370/229 |
| 8,270,423 B2* | 9/2012 | Plamondon | ........... | H04L 1/1887 370/252 |
| 8,346,225 B2* | 1/2013 | Raleigh | .............. | H04L 41/0806 370/230 |
| 8,369,235 B2* | 2/2013 | Kim | ..................... | H04L 45/121 370/236 |
| 8,484,156 B2* | 7/2013 | Hancsarik | .............. | G06F 9/544 707/602 |
| 8,966,002 B2* | 2/2015 | Hong | .................... | G08G 1/092 709/217 |
| 2003/0195997 A1* | 10/2003 | Ibert | ........................ | G06F 9/542 719/318 |
| 2005/0163047 A1* | 7/2005 | McGregor | ............ | H04W 24/00 370/229 |
| 2006/0072451 A1* | 4/2006 | Ross | ...................... | H04L 47/10 370/229 |
| 2007/0041330 A1* | 2/2007 | Bostica | ................. | H04W 24/00 370/252 |
| 2007/0058561 A1 | 3/2007 | Virgile | | |
| 2008/0049638 A1* | 2/2008 | Ray | ..................... | H04L 41/0896 370/252 |
| 2009/0010228 A1* | 1/2009 | Wang | .................. | H04B 1/7105 370/335 |
| 2010/0220615 A1* | 9/2010 | Enstrom | .......... | H04L 29/06027 370/252 |
| 2010/0268834 A1* | 10/2010 | Eidelman | ............ | H04L 12/2697 709/230 |
| 2011/0014925 A1* | 1/2011 | Antic | .................... | H04W 16/06 455/452.2 |
| 2011/0310731 A1* | 12/2011 | Park | ...................... | H04W 28/18 370/230 |
| 2011/0314145 A1* | 12/2011 | Raleigh | ............... | H04L 41/0893 709/224 |
| 2013/0107706 A1* | 5/2013 | Raleigh | ............... | H04L 41/0806 370/230 |
| 2015/0249934 A1* | 9/2015 | Siomina | ................ | G01S 5/0205 370/252 |

OTHER PUBLICATIONS

International Search Report and Witten Opinion for International Application No. PCT/SG2010/000354 dated Nov. 23, 2010, pp. 9.

Kumar, A., et al., "RTSP Audio and Video Streaming QoS in Wireless Mobile Devices", IJCSNS International Journal of Computer Science and Network Security, vol. 4, Issue 1, pp. 96-101 (Jan. 2008).

Markus, C., et al., "Adaptive Middleware for Context-Aware Applications in Smart-Homes," Proceedings of the 2nd workshop on Middleware for pervasive and ad-hoc computing, pp. 111-116, (Oct. 13, 2004).

* cited by examiner

DYNAMIC MOBILE APPLICATION QUALITY-OF-SERVICE MONITOR

CROSS-REFERENCE TO RELATED APPLICATIONS

The present application is a continuation application under 35 U.S.C. § 120 of U.S. patent application Ser. No. 13/003,235, filed on Jan. 7, 2011, now U.S. Pat. No. 9,629,012, entitled "DYNAMIC MOBILE APPLICATION QUALITY-OF-SERVICE MONITOR," which in turn is a U.S. National Stage filing under 35 U.S.C. § 371 of International Application No. PCT/SG2010/000354, filed on Sep. 20, 2010, entitled "DYNAMIC MOBILE APPLICATION QUALITY-OF-SERVICE MONITOR." U.S. patent application Ser. No. 13/003,235 and International Application No. PCT/SG2010/000354, including any appendices or attachments thereof, are hereby incorporated by reference in their entirety.

BACKGROUND

In the field of computer networking, which includes packet-switching networks, it is a constant challenge to allocate limited amount of resources to serve as many applications and devices on a network as possible. For example, for a network application to function properly, it may require a certain amount of network throughput, as well as a guarantee that any delays, jitters, packet droppings, or bit error probabilities associated with the network application are below a certain threshold level. It is often insufficient to allocate resources for a network application to adequately support some services, while neglecting other services. To illustrate, suppose a video streaming application is configured to operate at a high bit rate. Such an application may still encounter adoption issues if a high level of jitters or errors are present in the streaming data.

One approach to guarantee a high level of performance and service quality, for example, providing high bit rate, low latency, and low bit error rate, is to quickly detect and address any actual or potential problems in a network communication session. However, merely examining a single aspect of the network communication session (e.g., bit rate) may not be sufficient to adequately address the performance problems associated with the network communication session.

SUMMARY

In accordance with at least some embodiments of the present disclosure, a method for determining a quality-of-service of a mobile application executing on a mobile device coupled to a network is presented. In an example, the method may be implemented by a mobile monitoring application (ALMA), and includes collecting network usage measurements associated with a network communication session over a first network communication layer executing on the mobile device, wherein the network usage measurements are indicative of mobile application data received by the mobile device. The method may also include evaluating the network usage measurements to determine application-specific usage data associated with the mobile application, and determining the quality-of-service of the mobile application based on the application-specific usage data.

In accordance with other embodiments of the present disclosure, a method for determining a quality-of-service of a mobile application executing on a mobile device is presented. In an example, the method may include invoking, by a mobile application, a mobile monitoring application (MMA) via an application programming interface (API) supported by the MMA, wherein the MMA, is configured to execute on a mobile device and monitor multiple mobile applications executing on the mobile device. The method also includes collecting, by the MMA, network usage measurements associated with the mobile application, wherein the network usage measurement are indicative of mobile application data received by the mobile device, and determining the quality-of-service of the mobile application based on the collected usage measurements.

In accordance with at least some embodiments of the present disclosure, a mobile device may include a mobile application configured to execute on the mobile device. The mobile device may further include a monitoring application configured to execute on the mobile device and monitor the mobile application during communication via a network. The monitoring application may further be configured to collect network usage measurements from a network communication session conducted via the network and indicative of mobile application data received by the mobile device, and evaluate the collected network usage measurements to determine application-specific usage data associated with the mobile application, and determine the quality-of-service of the mobile application based on the application-specific usage data, wherein the application-specific usage data is operable to determine the quality-of-service of the mobile application.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
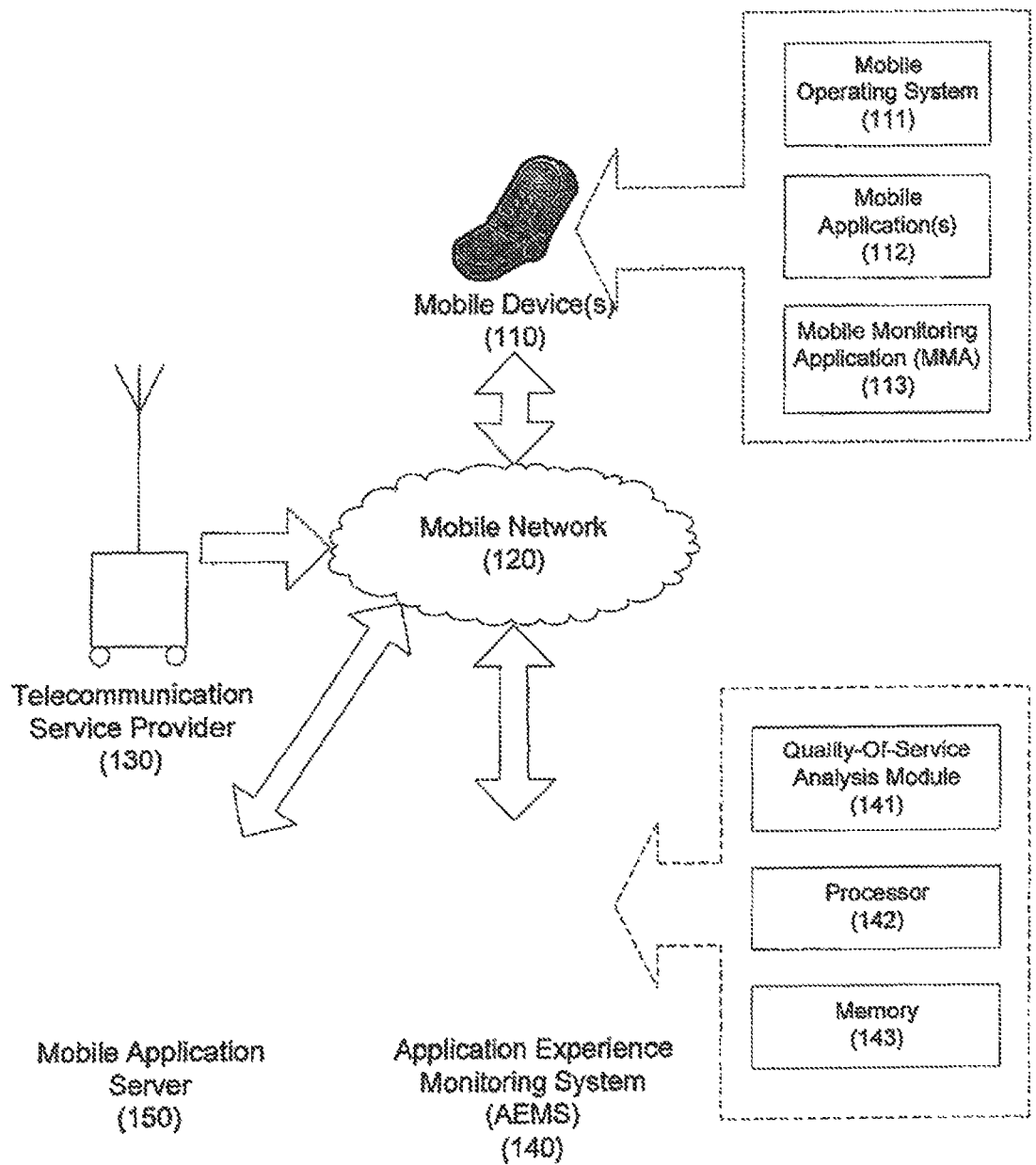
FIG. 1 shows a block diagram of an operational environment in which illustrative embodiments of a mobile monitoring application and an application experience monitoring system may operate to determine the quality-of-service of mobile applications.

In the following detailed description, reference is made to the accompanying drawings, which form a part hereof in the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

This disclosure is drawn, inter cilia, to methods, apparatus, computer programs and systems related to dynamic mobile application quality-of-service monitoring and reporting. Throughout the disclosure, the term "quality-of-service", or "QoS," may broadly refer to the quality of a network communication session in terms of bandwidth, signal-to-noise ratios, bit error rate, latency, packet losses, or other performance measurements across different network segments (e.g., access, metro, or core segments). Thus, the quality-of-service of an application executing on a computing device may correspond to the quality of the network communication session experienced by such an application.

The term "network usage measurements" may broadly refer to performance, status, or exception information associated with one or more network communication sessions. Some example performance and status information may include, without limitation, application usage bandwidth, network layer and protocol utilization, port mappings, packet statistics, or routing tables. Some example exception information may include, without limitation, packet loss, packet retransmissions, bit error rate, error bursts, signal-to-noise ratio, noise margin, or error correction code data. Furthermore, the network usage measurements may be associated with multiple mobile applications. That is, the network usage measurements may be collected for a single network connection when the multiple mobile applications are simultaneously conducting network communications through this network connection.

The term "application-specific usage data" may broadly refer to a set of network usage data that are derived from the network usage measurements and are associated with a specific mobile application. As described above, the network usage measurements collected from a networking device may be generated by multiple mobile applications. In some embodiments, some of the network usage measurements that are associated with a specific mobile application may first be identified. The identified network usage measurements may reflect the specific mobile application's networking activities, and may be highly relevant in analyzing the performance of the specific mobile application. These identified network usage measurements may be further analyzed to generate the application-specific usage data. For example, the analysis may generate a maximum, minimum, average, or median network throughput value for the particular mobile application. In alternative embodiments, the identified network usage measurements may be deemed the application-specific usage data without any further analysis. Based on the application-specific usage data, a quality-of-service value for the specific mobile application may be generated.

FIG. 1 shows a block diagram of an operational environment in which illustrative embodiments of a mobile monitoring application and an application experience monitoring system may operate to determine the quality-of-service of mobile applications. As depicted in FIG. 1, a mobile device 110 may be configured to communicate with a mobile application server 150 via a network 120. The network 120 may be provided and managed by a telecommunication (Telco) service provider 130. The mobile device 110 may contain, among other things, multiple hardware or software components, such as a mobile operating system (OS) 111, one or more mobile applications 112, and a mobile monitoring application (MMA) 113.

In some embodiments, the mobile device 110 may be configured to communicate with other applications and/or devices in a network environment. Some examples of the mobile device 110 may include, without limitation, a Personal Digital Assistant (PDA), cell phone, smart-phone, tablet computer, laptop computer, netbook, or other network appliance capable of communicating over the network 120. The mobile device 110 may support various mobile telecommunication standards such as, without limitation, Global System for Mobile communication (GSM, Code Division Multiple Access (CDMA), or Time Division Multiple Access (TDMA).

In some embodiments, the mobile OS 111 may provide functions to and support communication standards for the mobile device 110. Some examples of the mobile OS 111 may include, without limitation, Symbian®, RIM Blackberry®, Apple iPhone®, Windows Mobile®, or Google Android®. The mobile OS 111 may also provide a common programming platform or executing environment for the mobile applications 112 and the MMA 113.

In some embodiments, the MMA 113 may monitor the mobile applications 112 and interact with an application experience monitoring system (AEMS) 140. The AEMS 140 may contain, among other things, a quality-of-service (QoS) analysis module 141, one or more processors 142, and a memory 143. The MMA 113 and the AEMS 140 may analyze the data communication between the mobile applications 112 and the mobile application server 150 and determine quality-of-service values for the mobile applications 112. The quality-of-service values may be further aggregated and/or processed for reporting or for detecting network communication problems.

In some embodiments, the mobile applications 112 may perform networking functions such as telephony, email, text-messaging, web-browsing, and/or other functions such as audio/video playing, digital picture/video capturing, uploading of data/content, downloading of data/content, etc. Some examples of the mobile applications may include, without limitation, Voice over IP (VoIP), web-browsing, audio and/or video streaming, gaming, and other networking related applications. During operation, the mobile applications 112 may communicate with their respective mobile application servers 150 via the network 120.

In some embodiments, the network 120 may be, without limitation, a wireless network, such as mobile device network (e.g., GSM, CDMA, or TDMA), wireless local area network (WLAN), wireless Metropolitan area network (WMAN), or the like or any combination thereof. The network 120 may also be a wired network, such as local area network (LAN), wide area network (WAN), metropolitan area network (MAN), global area network such as the Internet, a Fibre Channel fabric, or any combination of such interconnects. Network communications, such as HTTP requests/responses, Wireless Application Protocol (WAP) messages, Mobile Terminated (MT) Short Message Service (SMS) messages, Mobile Originated (MO) SMS messages, or any type of network messages may be exchanged among the devices coupled to the network 120.

In some embodiments, the mobile application server 150 may communicate with the mobile applications 112 to provide different types of services, such as, without limitation, telephony, email, text-messaging, or real-time audio/video streaming services to the multiple mobile devices 110.

In some embodiments, the MMA 113, individually and/or in combination with the AEMS 140, may determine the quality-of-service of the mobile applications 112 communicating with the mobile application server 150 via the network 120. The MMA 113 can perform functions such as determining the types of the mobile applications 112 that are available in the mobile device 110, detecting the initialization and execution of the mobile applications 112, collecting the network usage measurements of the mobile applications 112, and/or determining the quality-of-service of the mobile applications 112. The details of the MMA 113 are further described below.

In some embodiments, the AEMS 140 may be configured as a server or a router coupled to the network 120 and may communicate with the one or more MMAs 113 executing on the one or more mobile devices 110. The QoS analysis module 141 of the ALMS 140 may receive network usage measurements and quality-of-service values from the one or more MMAs 113. Afterward, the QoS analysis module 141 may determine the quality-of-service of the mobile applications 112 executing on their respective mobile devices 110 in real-time. The resulting quality-of-service values may be reported to the Telco service provider 130, the providers of the mobile application server 150, and/or the mobile devices 110 for, by way of example, status reporting, feature enhancement, or debugging purposes. In some embodiments, the MMAs 113 may be executing on the AEMS 140, monitoring and communicating with their respective mobile devices 110 via the mobile network 120. The details of the AEMS 140 and the QoS analysis module 141 are further described below.

In some embodiments, the processor 142 may generally control the operations of the ALMS 140 in performing QoS monitoring and reporting, and the memory 143 may be configured to store the data transmitted to or received from the network 120.

Figure 2:
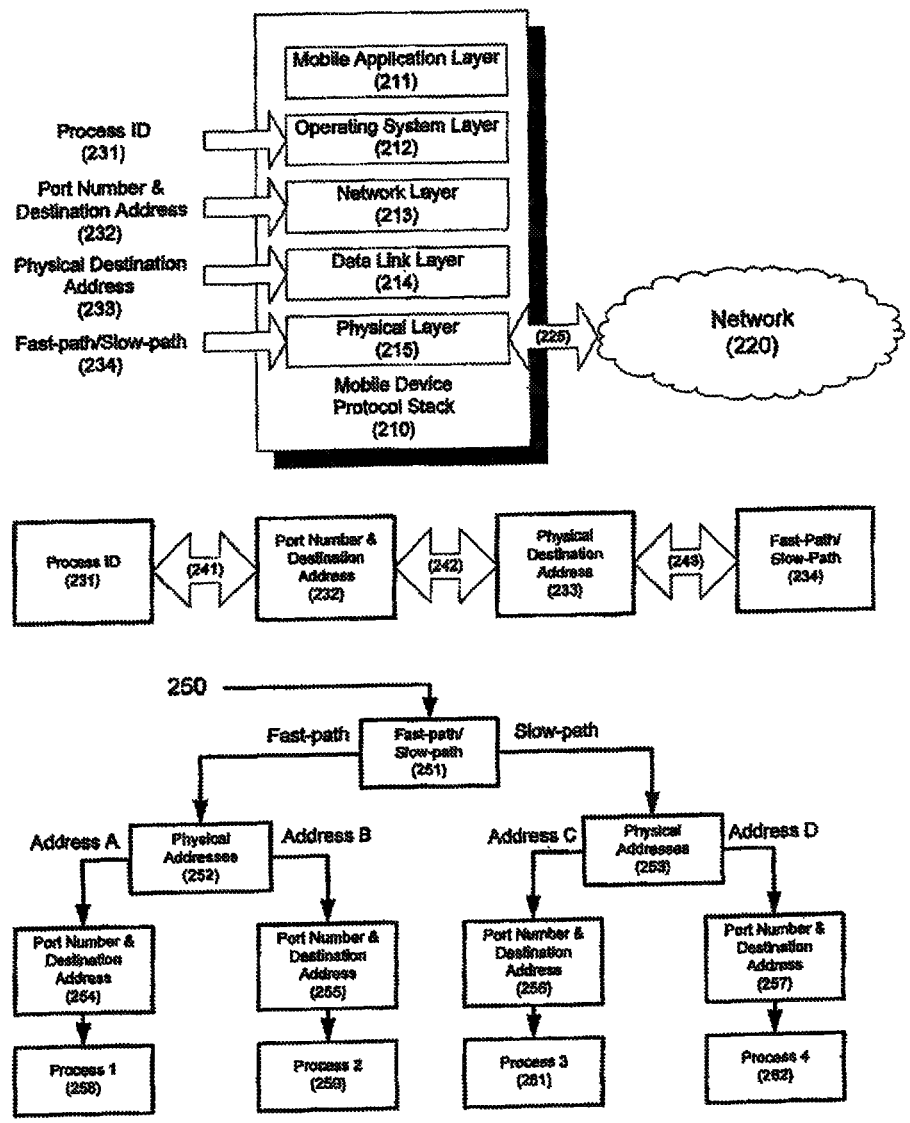
FIG. 2 shows an illustrative embodiment of a network communication protocol stack, an illustrative embodiment of associations among different identifiers, and an illustrative embodiment of a decision tree for quick determination of the identities of mobile applications.

FIG. 2 shows an illustrative embodiment of a network communication protocol stack, an illustrative embodiment of associations among different identifiers, and an illustrative embodiment of a decision tree for quickly determining the identities of mobile applications. As depicted in FIG. 2, a MMA or a mobile application executing on a mobile device may utilize a mobile device protocol stack 210, displayed in a top-down order, to conduct a network communication session. Each layer in the mobile device protocol stack 210 may implement a collection of functions which provide services to the layer above it, and utilize services from the layer below it. For example, before a message originating from a mobile application, such as the mobile application 112 of FIG. 1, is transmitted to a network 220, the mobile application may generate a network message 225 by encapsulating the message with header and/or footer information associated with each of the network communication layers 211-215 in the mobile device protocol stack 210.

In some embodiments, the mobile device protocol stack 210 may contain a mobile application layer 211, an operating system layer 212, a network layer 213, a data link layer 214, and a physical layer 215, all according to various known network communication standards. Further, the mobile device protocol stack 210 may contain additional or different network communication layers based on the networking functions that need to be supported.

In some embodiments, the MMA may invoke different network utility tools to collect network usage measurements from the network communication layers 211-215. Alternatively, the MMA may contain programming logic to listen to monitor) different communication channels and ports, and collect the network usage measurements at the different network communication layers 211-215. For example, the MMA may execute a network utility tool similar to UNIX's "ps" command at the operating system layer 212 to retrieve a list of mobile applications executing on the mobile device. The outcomes of the "ps" like network utility tool may contain network usage measurements such as, without limitation, process names, process IDs, and system resource usages. Similarly, the MMA may use a "netstat" like network utility tool in a MS WINDOWS® environment to collect TCP/IP metrics from the network layer 213. The MMA may use similar network utility tools to collect from the network layers 213 additional TCP/IP network usage measurements, which may include, without limitation, name of the protocols associated with the network communication sessions, local address, foreign address and the port number used during the network communication sessions.

In some embodiments, the network usage measurements collected from the network layer 213 may be originated from multiple network communication sessions, and may be associated with various mobile applications executing on the mobile device. To better measure the performance of a specific mobile application, the MMA may process the collected network usage measurements by extracting a subset of the network usage measurements related to a specific mobile application, and use the subset of the network usage measurements to determine the "application-specific usage data" for the specific mobile application. The MMA may then use the application-specific usage data to determine a quality-of-service value for the specific mobile application.

In some embodiments, the subset of the network usage measurements may be extracted from the entire set of network usage measurements using one or more identifiers that can be used to uniquely identify the specific mobile application. In some instances, each collected network usage measurement may contain a single identifier which may be sufficient for identifying the mobile application that is responsible for the network usage measurement. In this case, the subset of the network usage measurements may be extracted from the entire set of network usage measurements using the single identifier. In other instances, each network usage measurement may contain multiple identifiers which may be sufficient for identifying the mobile application. These multiple identifiers may then be used to extract the subset of measurements from the entire set of network usage measurements. In some further instances, the one or more identifiers contained in the collected network usage measurements may not be sufficient for identifying specific mobile applications. In this case, the MMA may use associations to ascertain additional identifiers based on the one or more identifiers, and employ the additional identifiers to identify the specific mobile application and extract the subset of network usage measurements.

Elaborating on the description above, the network usage measurements collected from the operating system layer 212 may contain a process ID 231. The process ID 231 may be sufficient for identifying a specific mobile application executing on the mobile device. By filtering the network usage measurements collected from the operating system layer 212 using the process ID 231, the MMA may extract the subset of network usage measurements (which is associated with the specific mobile application) from the entire set of network usage measurements (which is for all the mobile applications executing on the mobile device). The MMA may further analyze and process the subset of network usage measurements to generate the application-specific usage data.

In some instances, the network usage measurements collected from the network layer 213 may not contain a single identifier such as a process name or a process ID. Rather, they may contain multiple identifiers which are sufficient for identifying the specific mobile application. For example, if the specific mobile application's network communication port and destination address (e.g., a port number & destination address 232) are known and unique, then the port number & the destination address 232 may be deemed the multiple identifiers that can be used to identify the specific mobile application. To illustrate, suppose a browser mobile application is the only mobile application in the mobile device accessing a web site "www.cnn.com" via the port 80. Then any network usage measurement that is associated with the port 80 and the destination address for "www.cnn.com" may be related to the browser mobile application. In other words, based on the multiple identifiers (e.g., the port number & destination address 232), a subset of network usage measurements for the specific mobile application may be identified and extracted from the entire set of network usage measurements.

In other instances, the network usage measurements collected from the different network communication layers 212-215 may contain different identifiers, and some network usage measurements collected from a particular network communication layer may contain one or more identifiers that are insufficient for identifying the specific mobile application. In this case, the MMA may try to ascertain additional identifiers that are related to the one or more identifiers, and use the additional identifiers to identify the specific mobile application. For example, assume the network usage measurements collected from the operating system layer 212 may contain a single identifier (process ID 231). The network usage measurements collected from the network layer 213 may contain multiple identifiers (port number & destination address 232). The network usage measurements collected from the data link layer 214 may contain a physical destination address 233 (e.g., MAC address). And the network usage measurements collected from the physical layer 215 may contain a fast-path/slow-path 234. In some embodiments, the physical destination address 233 or the fast-path/slow-path 234 may be the identifiers that are insufficient for identifying the specific mobile application by themselves.

In some embodiments, the physical destination address 233 may have an association 242 with additional identifiers (e.g., port number & destination address 232). An association may be a relationship between two different sets of identifiers. In other words, when the physical destination address 233 is uniquely related to the destination address of the "port number & destination address 232", and when the specific mobile application may be identified using the "port number & destination address 232", the specific mobile application may be identified using the identifier "physical destination address 233" and the identifiers "port number & destination address 232", which are obtained via the association 242.

Similarly, when the "port number & destination address 232" are not sufficient for identifying the specific mobile application, and there is an association 241 between the "port number & destination address 232" and the identifier "process id 231", the MMA may identify the specific mobile application using the "port number & destination address 232", and the "process ID 231" (which is obtained via the association 241). Specifically, the MMA may process a particular network usage measurement collected from the data link layer 214 to obtain its physical destination address 233, then use the physical destination address 233 to obtain the port number & destination address 232 via the association 242, and then use the port number & destination address 232 to find the process id 231 via the association 241. Based on the process id 231, the MMA may ascertain the specific mobile application that is responsible for the particular network usage measurement.

In some embodiments, the MMA may establish associations among the different identifier sets by processing the network usage measurements collected from the different network communication layers 211-215. For example, the network usage measurements collected from the data link layer 214 ("data link layer measurements") may contain the identifier "physical destination address 233", as well as some specific network transmission information such as fast-path/slow-path. Fast-path may allow the network data frames to be quickly transmitted by the physical layer 215, while the slow-path may ensure that the network data frames be transmitted more reliably. In addition, network usage measurements collected from the physical layer 215 ("physical layer measurements") may also contain the fast-path/slow-path characteristics. Thus, the fast-path/slow-path 234 information that exist in the data link layer 214 and the physical layer 215 may be used to create association 243 between the identifier "physical destination address 233" and the identifier "fast-path/slow-path 234." In other words, if a physical layer measurement is fast-path, and a data link layer measurement is also fast-path, then it might be likely that the data link layer measurement and the physical layer measurement may be related. Thus, the MMA may extract the identifier "fast-path/slow-path 234" from the physical layer measurement, ascertain the identifier "physical destination address 233" via the association 243, ascertain the identifiers "port number and destination address 232" via the association 242, and ascertain the identifier "process id 231" via the association 241. The MMA may then identify the specific mobile application for the physical layer measurement using the identifier "process id 231."

In some embodiments, to improve performance, the MMA may utilize a decision tree 250 to quickly manage and traverse the associations among the different identifiers for the network usage measurements collected from the network communication layers 211-215. Each node of the decision tree 250 may be a value determination for a particular identifier, and the links among the nodes may represent the associations among the different identifiers. During its processing of the various network usage measurements collected from the different network communication layers 211-215, the MMA may dynamically construct and update the decision tree 250 based on the identifiers and associations discovered among the network usage measurements. For example, in the generated decision tree 250, the "fast-path" identifier may be associated with physical addresses 252 (which may include address A or B), and "slow-path" may be associated with physical addresses 253 (which may include address C or D). Likewise, "address A" may be associated with "port number & destination address 254." And the "port number & destination address 254" may be associated with "process 1" (258). By organizing the above associations in a tree-like structure, the resulted decision tree 250 may be quickly traversed.

In some embodiments, by using the exemplary decision tree 250, the MMA may quickly determine the mobile applications for the network usage measurements collected from the physical layer 215. For example, for each physical layer network usage measurement, the MMA may extract its fast-path/slow-path characteristic. Assuming the network usage measurement shows that the physical layer communication uses a "fast-path" approach, the MMA may then select the left-branch of the decision tree 260. If previous determination has identified that at the time of the network usage measurements are collected, only "address A" has been used for communication at the data link layer 214, then MMA may select the left path of the "physical addresses" node 252. Based on the associations among nodes 252, 254, and 258, the MMA may quickly determine that "process 1" may be the mobile application that is likely related to the specific network usage measurement.

In some embodiments, even when unique association may not be established among the different identifiers, the above approach may greatly narrow down the potential mobile application(s) that are related to the specific network usage measurements. Such an approach may still allow the MMA to estimate the possible quality-of-service, or to determine the possible network issues for the mobile application(s).

Figure 3:
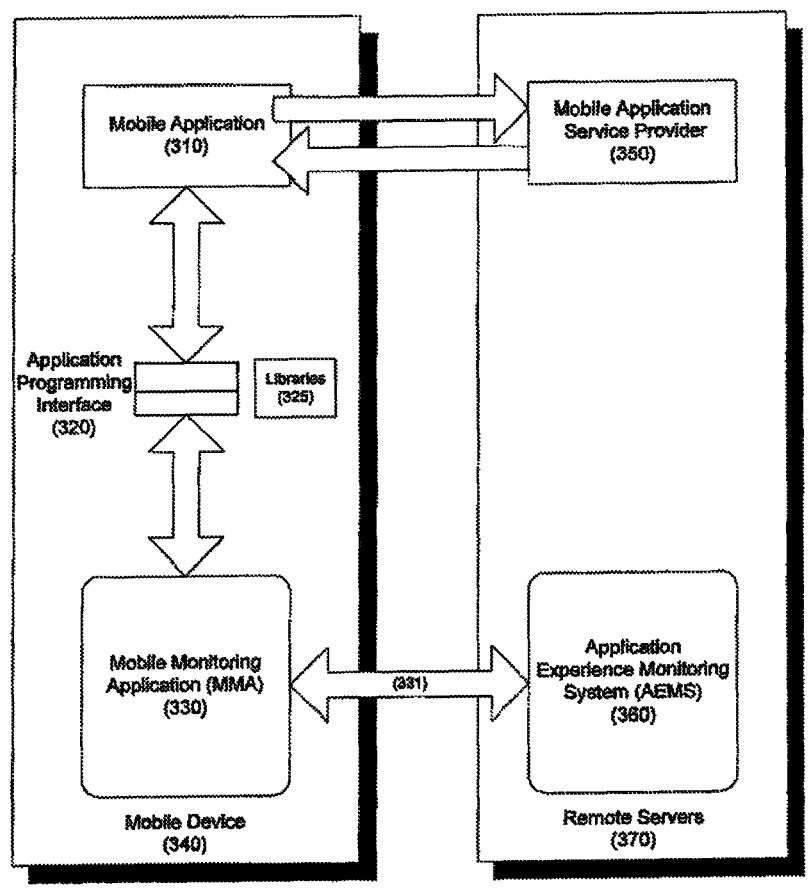
FIG. 3 shows example scenarios for determining the quality-of-service of mobile applications.

FIG. 3 shows example scenarios for determining the quality-of-service of mobile applications. As depicted in FIG. 3, a MMA 330, along with one or more mobile applications 310, may be installed and configured to operate on a mobile device 340. The mobile applications 310 and the MMA 330 may communicate with each other via a set of application program interfaces (APIs) 320. For example, the APIs 320 may set forth the method names for some or all of the functions of MMA 330 that may be invoked by other applications (e.g., the mobile applications 310), as well as the input/output parameters required for invoking these functions. In some embodiments, the mobile device 340 may also be configured with a set of static or dynamic libraries 325 to support the mobile application 310 during its execution on the mobile device 340. The libraries 325 and/or some or all of the APIs 320 may be a part of a software development kit (SDK), which provides a programming environment for developing applications, such as the mobile application 310. In some embodiments, the MMA 330 may be a hardware component integrated into the mobile device 340. Alternatively, the MMA 330 may be an application similar to the mobile applications 310.

An AIMS 360 may be implemented as an aggregation system for communicating with the MMA 330 via a communication channel 331. The MMA 330 may be designed to detect and monitor the mobile applications 310 accessing a certain network. During normal operations, the mobile applications 310 may communicate with a mobile application service provider 350. The mobile applications 310 and the mobile application service provider 350 may or may not be aware of the presence of the MMA 330 or the AEMS 360.

In some embodiments, the MMA 330 may be invoked by a user of the mobile device 340 or one of the mobile applications 310, or may be automatically initiated by the mobile OS of the mobile device 340 during boot-up. Once initiated, the MMA 330 may operate as a background process, detecting and monitoring the one or more instances of the mobile application 310 executing on the mobile device 340. The MMA 330 may identify different types of the mobile applications 310 and monitor the initialization and the execution of these mobile applications 310. For example, the MMA 330 may detect the installed mobile applications 310, executing or not, by their application names or Multipurpose Internet Mail Extensions (MIME) types. The MIME information allows the MIA 330 to identify file types such as images, sounds, videos, or computer programs. Even without the application names or MIME types, the MMA 330 may also identify the mobile applications 310 by inquiring the mobile OS of the mobile device 340 for the names of the mobile applications that are executing, or by evaluating the network usage patterns of the mobile applications that are executing. For example, the MMA 330 may determine that a mobile application is a video streaming application if the network usage pattern indicates that the mobile application is causing a large amount of streaming data being downloaded to the mobile device 340.

In some embodiments, the types of mobile applications 310 that may be monitored by the MMA 330 and/or the AEMS 360 may include, without limitation, VoIP (e.g., Skype®), audio/video streaming, MMS, GPS navigation, video-conferencing, video uploading, email reception, email attachment transmitting and/or receiving, music download/upload, online gaming, or web browsing. Further, the MMA 330 may perform monitoring functions on the executing mobile applications that are recognized or supported, and provide individualized and/or comprehensive quality-of-service analysis.

In some embodiments, rather than being passively monitored by the MMA 330, the mobile application 310 may proactively invoke the MMA 330 to determine the network performance that the mobile application 310 is currently experiencing. For example, the mobile application 310 may detect an exception that may affect its network performance and request the MMA 330 to collect relevant information associated with the exception (e.g., reasons for the exception and the operational environment under which the exception occurs) for debugging purposes. After having collected the information, the MMA 330 may store the collected information in a database accessible by the mobile application 310. The MMA 330 may subsequently forward the collected network usage measurements and/or the determined QoS information to the mobile application 310 and/or the AEMS 360. Such an approach allows the mobile application 310 to proactively initiate the determination of its own QoS information.

In some embodiments, the MMA 330 may collect network usage measurements from a certain network communication layer, such as the application-layer level, so that the calculated quality-of-service value may correspond more directly to what is experienced by the mobile application 310. Some example network usage measurements that the MMA 330 may track at the application-layer level may include, without limitation, application launch time, application type, number of users using such an application, the features of the application being used, network status, glitches, and/or exceptions encountered. Based on the collected network usage measurements, the MMA 330 may generate and send the quality-of-service information for the mobile application 310 to the AEMS 360. Alternatively, the MMA 330 may collect network usage measurements from multiple network communication layers and also from multiple network communication sessions that are conducted on the mobile device 340.

In some embodiments, the mobile application 310 may be programmed based on programming languages such as C/C++ or Java. The invocation of the APIs 320 may be placed in the exception handling section of the source code for the mobile application 310. Some programming languages such as Java and C++ offer exception handling mechanisms to allow an application to continue its operations without crashing, even when some unintended events, such as exceptions occur. For example, when trying to access an otherwise existing network port, the mobile application 310 may receive an exception when such a network port cannot be accessed. Thus, in the exception handling source code, the mobile application 310 may request the MMA 330 via the APIs 320 to collect error information associated with the exception, in order to determine the QoS information relating to such an error condition.

In some embodiments, the APIs 320 may be defined as a set of object-oriented overloading methods. Overloading allows the reuse of the same method for different operations. The overloading methods may replace the methods regularly used by the mobile application 310 but without requiring substantial source code changes. For example, suppose the mobile application 310 is a data-streaming mobile application and is running out of data to decode. The mobile application 310 may raise an exception to halt the decoding operation, so that a buffering mechanism may be activated to load additional data. In this case, the buffering method may be replaced with an overloading buffering method that is defined and provided by the aforementioned SDK. The overloading buffering method may perform the original buffering functions and also collect time information, such as the time when the mobile application 310 switches from its decoding operation to the buffering operation, any warnings, errors, and/or status information associated the mobile application 310. Thus, by using the aforementioned overloading mechanism, the MMA 330 and the APIs 320 may be efficiently deployed to the mobile device 340 without having to significantly alter the mobile application 310.

In some embodiments, the AEMS 360 may be configured to load the quality-of-service information from multiple mobile devices 340 and aggregate the information for statistical reporting purposes. For example, the AEMS 360 may collect the times of the various mobile applications 310 being launched at different mobile devices 340, as well as the network performance information during the same period. With such information, the AEMS 360 may determine whether any correlation exists between the launching of the mobile applications 310 and the network performance. The ALMS 360 may also be configured to aggregate the application-layer level actions, warnings, and exceptions encountered by the mobile applications 310. The aggregated data may be shown in a statistical report (e.g., Google Analytics report). Such a report may provide network operators and application developers with valuable information related to application usage, application optimization, and advertisement integration. Further, the MMA 330 and the AEMS 360 may be configured to offer end-to-end quality-of-service monitoring reports, which may contain real-time mobile application data, actions, and exceptions. These types of monitoring reports for a mobile application may become a business product, and the aggregated data may also be sold to interested network operators.

In some embodiments, for each type of the mobile application 310 being monitored, the MMA 330 and/or the AEMS 360 may implement a utility function specifically tailored to the mobile application 310 for quick quality-of-service calculation and determination. The utility function may be implemented to accept the network usage measurements as input parameters and generate a quality-of-service value as an output. For example, the utility function may accept input parameters such as bandwidth, packet loss, delay, jitter, and bit-error rate, the output of the utility function may be the quality-of-service value corresponding to how well the mobile application 310 performs under the network constraints.

Figure 4:
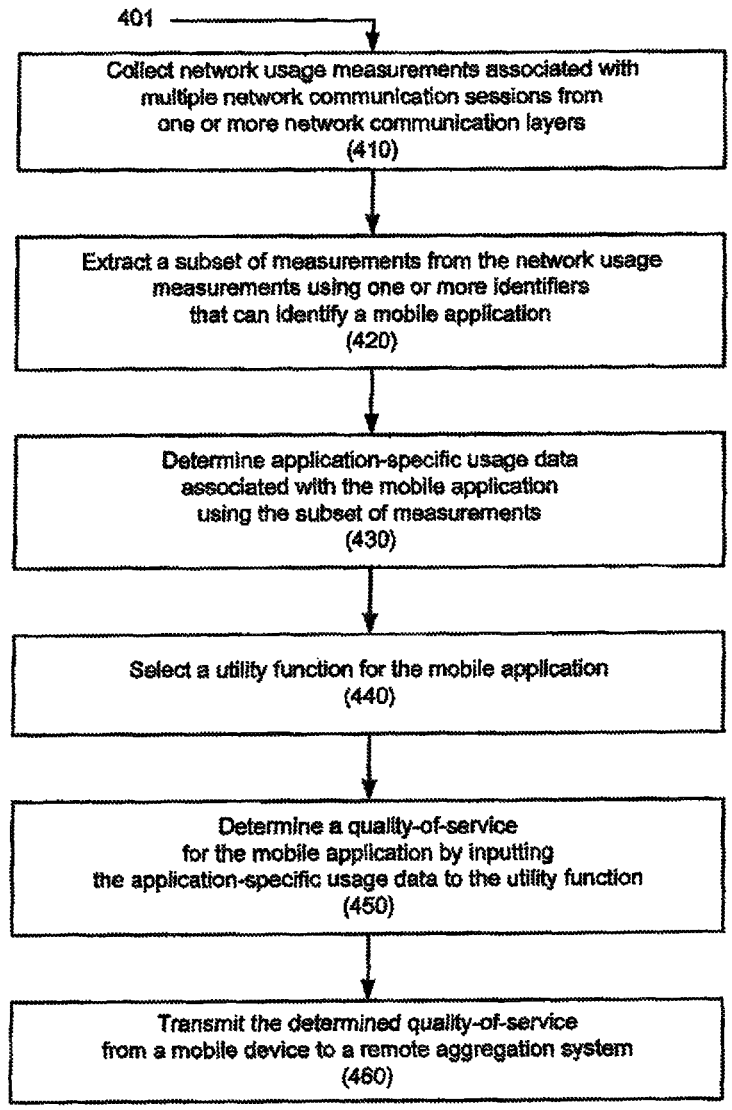
FIG. 4 shows a flow diagram of an illustrative embodiment of a process for monitoring and determining the quality-of-service of a mobile application.

FIG. 4 shows a flow diagram of an illustrative embodiment of a process 401 for monitoring and determining the quality-of-service of a mobile application. The process 401 sets forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 4 may be practiced in various implementations. In some embodiments, machine-executable instructions for the process 401 may be stored in memory, executed by a processor, and/or implemented in a mobile device, such as the mobile device 110, and/or an AEMS, such as the AEMS 140 of FIG. 1.

Process 401 may begin at block 410, "collect network usage measurements associated with multiple network communication sessions from one or more network communication layers." Block 410 may be followed by block 420, "extract a subset of measurements from the network usage measurements using one or more identifiers that can identify a mobile application." Block 420 may be followed by block 430, "determine application-specific usage data associated with the mobile application using the subset of measurements." Block 430 may be followed by block 440, "select a utility function for the mobile application," Block 440 may be following by block 450, "determine a quality-of-service for the mobile application by inputting the application-specific usage data to the utility function." And the block 450 may be followed by block 460, "transmit the determined quality-of-service from the mobile device to a remote aggregation system."

At block 410, a MMA executing on a mobile device may collect various network usage measurements associated with one or more network communication layers. The mobile device may have one or more mobile applications participating in multiple network communication sessions. From each of the network communication layers, the MMA may collect different types of the network usage measurements associated with the network communication sessions. For example, from a network layer (e.g., the network layer 213 of FIG. 2), the MMA may collect packet loss and packet retransmission information. From a physical layer (e.g., the physical layer 215 of FIG. 2), the MMA may collect bit error rate, error burst, signal-to-noise ratio, noise margin, and/or error correction code data (e.g., Reed-Solomon errors corrected, errors not corrected, and erasures). The collected network usage measurements may be for all the network communication sessions that the one or more mobile applications running on the mobile device participate in.

At block 420, after having collected the network usage measurements for a period of time, the MMA may extract a subset of measurements from the network usage measurements collected at block 410. The subset of measurements may be associated with a specific mobile application running on the mobile device. The MMA may retrieve one or more identifiers from the network usage measurements, and use the one or more identifiers to ascertain the specific mobile application that took part in the network communication sessions. In some embodiments, a single identifier may be sufficient in identifying the mobile application. For example, the network usage measurements collected from some network communication layers may contain a mobile application's process name or process id (pid). By using the unique process name or process id as an identifier, the MMA may extract the subset of measurements from the network usage measurements. Alternatively, multiple identifiers, obtained either from the network usage measurements or via associations among the identifiers, may be needed to pinpoint the mobile application. In some embodiments, the MMA may traverse a decision tree that maintains associations between the different identifiers, in order to ascertain the one or more identifiers that can identify the mobile application.

At block 430, the MMA may determine the application-specific usage data, such as, without limitation, bandwidth distribution, peak bandwidth, idle bandwidth, and average bandwidth, based on the subset of measurements extracted at block 420. Alternatively, the MMA may treat the subset of measurements for the mobile application as a form of the application-specific usage data. Thus, the application-specific usage data may include network performance indicators for a specific network application during a specific period of time.

At block 440, the MMA may select a utility function corresponding to the mobile application. As mentioned above, the utility function may accept a set of input parameters and output a quality-of-service result for the particular mobile application. Since different mobile applications may have different network usage characteristics, a utility function may be specifically tailored to a specific mobile application. For example, for buffering video, delay may not be an important performance measurement, but packet loss may be more significant, since it may cause glitches in the frames that are being displayed. In this case, a utility function which gives packet loss higher weight than delay may be selected for the video buffering application. On the other hand, for a voice mobile application, delay may have a larger impact on the quality-of-service than packet loss does. Thus, a utility function that emphasizes more on packet loss may be selected for the voice mobile application.

At block 450, the MMA may determine the quality-of-service for the particular mobile application based on the application-specific usage data. In some embodiments, the MMA may input the application-specific usage data obtained at block 430 into the utility function selected at block 440 to generate the quality-of-service value for the mobile application. For example, a utility function may take input parameters such as bw_p (peak bandwidth), bw_a (average bandwidth), pl (packet loss), ber (bit error rate), eb (error bursts), snr (signal-to-noise ratio), and nm (noise margin), and generate a corresponding quality-of-service value that can be evaluated or compared to determine how the mobile application performed during a period of time. At block 460, the MMA may transmit the determined quality-of-service value from the mobile device to an aggregation system, such as an AEMS. In some embodiments, the MMA may also periodically transmit quality-of-service values from different mobile applications executing on the mobile device to the AEMS. The quality-of-service for a particular mobile application on a specific mobile device may then be aggregated by the AEMS into statistic reports for further evaluation.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

Figure 5:
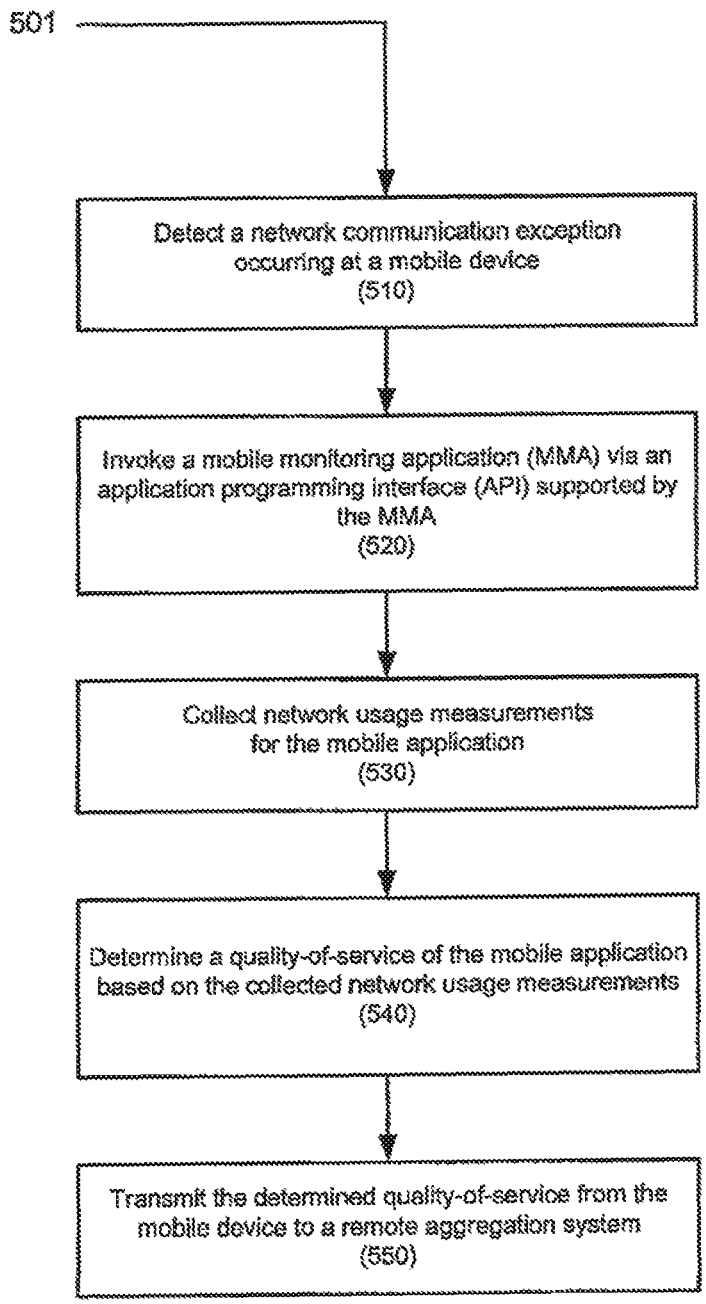
FIG. 5 shows a flow diagram of an illustrative embodiment of a process for determining a quality-of-service of a mobile application by invoking a mobile monitoring application.

FIG. 5 shows a flow diagram of an illustrative embodiment of a process 501 for determining a quality-of-service of a mobile application by invoking a mobile monitoring application. Process 501 sets forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 5 may be practiced in various implementations. In some embodiments, machine-executable instructions for process 501 may be stored in memory, executed by a processor, and/or implemented in a mobile device, such as the mobile device 110 of FIG. 1.

Process 501 may begin at block 510, "detect a network communication exception occurring at a mobile device." Block 510 may be followed by block 520, "invoke a mobile monitoring application (MMA) via an application programming interface (API) supported by the MMA" Block 520 may be followed by block 530, "collect network usage measurements for the mobile application." Block 530 may be followed by block 540, "determine a quality-of-service of the mobile application based on the collected network usage measurements." Block 540 may be following by block 550, "transmit the determined quality-of-service from the mobile device to an aggregation system."

At block 510, a mobile application executing on a mobile device may detect an occurrence of a network communication exception during its operations. The network communication exception may be caused by the lacking of certain network resources, such as bandwidth, or raised by the mobile operating system of the mobile device. The exception may also be a part of the programming logic of the mobile application. For example, the mobile application may raise the exception when a certain port is being used by other applications. Once the exception is raised and detected, the programming logic for the mobile application may be configured to abandon its normal operations and instead move into exception handling.

At block 520, the mobile application may invoke a MMA via an API during its exception handling process in response to the exception raised and/or detected at block 510. The API may be supported by the MMA, which may be configured to monitor and collect network usage measurements for multiple mobile applications executing on the mobile device. In some embodiments, the API may be explicitly invoked in the mobile application source code during its normal or exceptional operations. Alternatively, the API may be an overloading method to replace a standard method that is defined and provided by a SDK. Thus, when the standard method is invoked during run time, the mobile operating system may substitute the standard method with the overloading API method instead. As a result, the mobile application may activate the programming logics of the MMA by invoking a standard method, without knowing that the standard method is overloaded by the API.

In some embodiments, the MMA may be concurrently executing along with the mobile application on the mobile device and is configured to monitor different mobile applications at the same time. That is, the MMA may be idle or performing QoS monitoring of the other mobile applications on the mobile device when this particular mobile application invokes the MMA services via the API. Alternatively, the MMA may be activated via the API invocation. For example, the MMA may not be executing on the mobile device initially. When the mobile application invokes the API, the API may startup the MMA in order to perform the QoS functions accordingly. In some embodiments, the MMA and the mobile application are implemented using the same SDK. Thus, the API may be defined using the SDK's programming language. The mobile application's source code may then easily call the API to invoke the MMA using the SDK's programming language.

At block 530, once invoked by the mobile application, the MMA may collect the network usage measurements for the mobile application. When the mobile application invokes the MMA during exception handling, the MMA may further collect the error information related to the exception from the perspective of the mobile application. In some embodiments, the MMA may collect the measurements of the mobile application's network communications from the application-layer level. Specifically, the MMA may access to the mobile application's internal operational environment. For example, the MMA may read the mobile application's run-time memory space, CPU registers, and network stacks. Alternatively, the MMA may collect network usage measurements from multiple network communication layers such as network layer, data link layer, and/or physical layer, as described above. In this case, the network usage measurements collected by the MMA may be associated mainly with the mobile application that invoked the MMA, rather than all the mobile applications that are executing on the mobile device. Thus, the specific mobile application may actively participate in the determination of its own QoS by controlling when the MMA should start collecting network usage measurements, what types of measurements the MMA should collect, and how to calculate the QoS value.

At block 540, the MMA may determine a quality-of-service value for the mobile application based on the collected network usage measurements. In some embodiments, the MMA may select a utility function for the mobile application, and passes the collected network usage measurements as input parameters to the utility function. The utility function may then generate a quality-of-service indicator. Alternatively, the MMA may communicate with an aggregation system, forward the network usage measurements to the aggregation system, and rely on the aggregation system to generate such a quality-of-service value. At block 550, the MMA may transmit the determined quality-of-service value from the mobile device to the aggregation system, similar to block 460 of FIG. 4.

Figure 6:
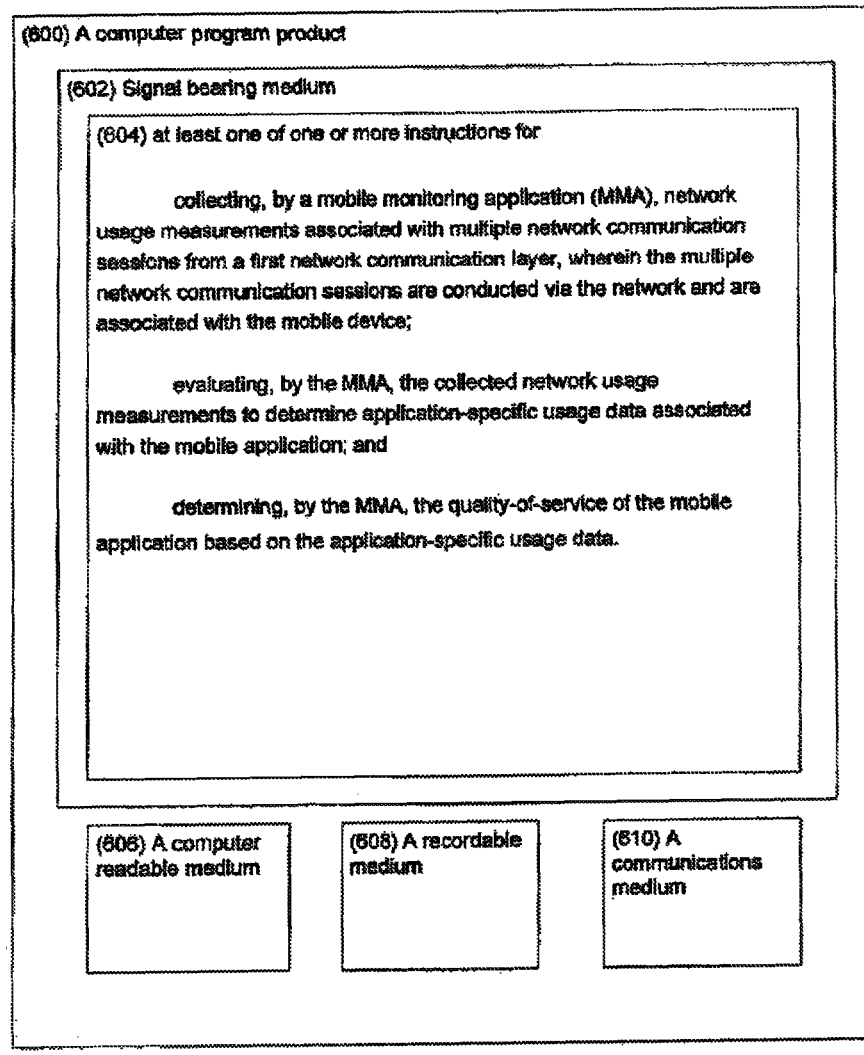
FIG. 6 shows an illustrative embodiment of an example computer program product arranged in accordance with the present disclosure.

FIG. 6 is a block diagram of an illustrative embodiment of a computer program product 600 for implementing a method for determining a quality-of-service of a mobile application executing on a mobile device. Computer program product 600 may include a signal bearing medium 602. Signal bearing medium 602 may include one or more sets of executable instructions 604 that, when executed by, for example, a processor, may provide the functionality described above. Thus, for example, referring to computer system of FIG. 1, the MMA 113 and the AEMS 140 may undertake one or more of the operations shown in at least FIG. 4 or FIG. 5 in response to instructions 604 conveyed by signal bearing medium 602.

In some implementations, signal bearing medium 602 may encompass a non-transitory computer readable medium 606, such as, but not limited to, a hard disk drive, a Compact Disc (CD), a Digital Video Disk (DVD), a digital tape, memory, etc. In some implementations, signal bearing medium 602 may encompass a recordable medium 608, such as, but not limited to, memory, read/write (R/W) CDs, RV DVDs, etc. In some implementations, signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, referring to the MMA 113 or the AEMS 140 of FIG. 1, computer program product 600 may be wirelessly conveyed to the MMA 113 or the AEMS 140 by signal bearing medium 602, where signal bearing medium 602 is conveyed by a wireless communications medium 610 (e.g., a wireless communications medium conforming with the IEEE 802.11 standard). Computer program product 600 may be recorded on non-transitory computer readable medium 606 or another similar recordable medium 608.

Figure 7:
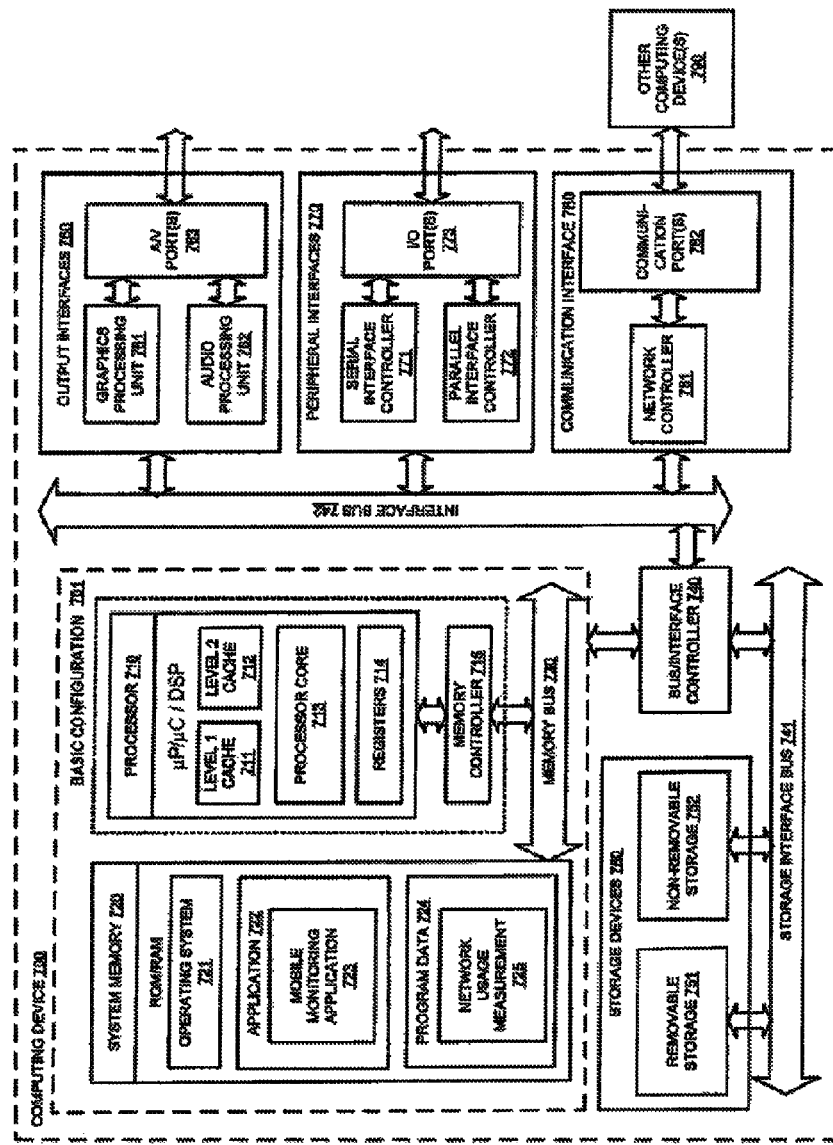
FIG. 7 shows a block diagram of an illustrative embodiment of an example computing device that can be arranged as a mobile device for use with the application experience monitoring system in accordance with the present disclosure.

FIG. 7 shows a block diagram of an illustrative embodiment of an example computing device 700 that can be arranged as a mobile device for use with the application experience monitoring system in accordance with the present disclosure. In a very basic configuration 701, computing device 700 may include one or more processors 710 and a system memory 720. A memory bus 730 may be used for communicating between the processor 710 and the system memory 720.

Depending on the desired configuration, processor 710 may be of any type including but not limited to a microprocessor (µP), a microcontroller (µC), a digital signal processor (DSP), or any combination thereof. Processor 710 can include one or more levels of caching, such as a level one cache 711 and a level two cache 712, a processor core 713, and registers 714. The processor core 713 can include an arithmetic logic unit (ALU), a floating point unit (FPU), a digital signal processing core (DSP Core), or any combination thereof. A memory controller 715 can also be used with the processor 710, or in some implementations the memory controller 715 can be an internal part of the processor 710.

Depending on the desired configuration, the system memory 720 may be of any type including but not limited to volatile memory (such as RAM), non-volatile memory (such as RUM, flash memory) or any combination thereof. System memory 720 may include an operating system 721, one or more applications 722, and program data 724. Application 722 may include a mobile monitoring application 723 that is arranged to perform the functions and/or operations as described herein including at least the functional blocks and/or operations described with respect to process 401 of FIG. 4 and process 501 of FIG. 5. Program Data 724 may include network usage measurements 725 for use by the mobile monitoring application 723. In some example embodiments, application 722 may be arranged to operate with program data 724 on an operating system 721 such that implementations of mobile application quality-of-service determination may be provided as described herein. This described basic configuration is illustrated in FIG. 7 by those components within dashed line 701.

Computing device 700 may have additional features or functionality, and additional interfaces to facilitate communications between the basic configuration 701 and any required devices and interfaces. For example, a bus/interface controller 740 may be used to facilitate communications between the basic configuration 701 and one or more data storage devices 750 via a storage interface bus 741. The data storage devices 750 may be removable storage devices 751, non-removable storage devices 752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 720, removable storage 751 and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 742 for facilitating communication from various interface devices (e.g., output interfaces, peripheral interfaces, and communication interfaces) to the basic configuration 701 via the bus/interface controller 740. Example output interfaces 760 may include a graphics processing unit 761 and an audio processing unit 762, which may be configured to communicate to various external devices such as a display or speakers via one or more A/V ports 763. Example peripheral interfaces 770 may include a serial interface controller 771 or a parallel interface controller 772, which may be configured to communicate with external devices such as input devices (e.g., keyboard, mouse, pen, voice input device, touch input device) or other peripheral devices (e.g., printer, scanner) via one or more I/O ports 773. An example communication interface 780 includes a network controller 781, which may be arranged to facilitate communications with one or more other computing devices 790 over a network communication link via one or more communication ports 782.

The network communication link may be one example of a communication media. Communication media may typically be embodied by computer readable instructions, data structures, program modules, or other transport mechanism, and may include any information delivery media. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 700 may also be implemented as a personal computer including both laptop computer and non-laptop computer configurations. In addition, computing device 700 may be implemented as part of a wireless base station or other wireless system or device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations; it will be understood by those within the art that each function and/or operation within such block diagrams, flowcharts, or examples can be implemented, individually and/or collectively; by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory; and a transmission type medium such as a digital and/or an analog communication medium (e.g., a fiber optic cable, a waveguide, a wired communications link, a wireless communication link).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality in a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to"). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations) Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method to determine quality-of-service (QoS) for applications installed in a communication device, the method comprising:

receiving network usage measurements associated with a network communication session that is conducted over a plurality of network communication layers;

processing a portion of the network usage measurements, associated with a first layer of the plurality of network communication layers, to obtain a first identifier of an application that executes on the communication device;

obtaining a second identifier of the application based on an association of the first identifier with the second identifier, wherein the second identifier is associated with a second layer of the plurality of network communication layers;

obtaining a process name or a process identifier of the application based on an association of the second identifier with at least one of the process name or the process identifier, wherein the process name or the process identifier is used to identify the application;

determining, based on the network usage measurements, network usage data associated with the application;

determining, based on the network usage data, a QoS of the application; and providing the determined QoS of the application to the communication device, wherein receiving the network usage measurements includes receiving the network usage measurements from a mobile monitoring application (MMA) that executes on the communication device.

2. The method of claim 1, further comprising invoking the MMA via an application program interface (API) supported by the MMA.

3. The method of claim 1, wherein determining the network usage data associated with the application includes determining the network usage data by traversing a decision tree.

4. The method of claim 1, wherein obtaining the second identifier includes ascertaining the second identifier by traversing a decision tree that maintains associations between the first identifier and the second identifier.

5. The method of claim 1, wherein determining the QoS of the application comprises:
   selecting a utility function for the application; and
   generating the QoS based on the network usage data that utilizes the utility function.

6. The method of claim 1, wherein determining the QoS of the application includes determining the QoS by a monitoring function that executes on a server communicatively coupled to the communication device via a network.

7. The method of claim 6, wherein determining the QoS of the application comprises:
   collecting, by the monitoring function, the network usage measurements from a plurality of communication devices; and
   determining, by the monitoring function, an aggregated QoS of a respective application that executes on each communication device of the plurality of communication devices.

8. The method of claim 1, wherein receiving the network usage measurements includes receiving bandwidth information, protocol, port, packet statistics, error information, and/or routing information associated with multiple applications that execute on the communication device.

9. The method of claim 1, wherein determining the network usage data associated with the application includes evaluating, based on the network usage measurements, performance and status information of the application.

10. A method to determine quality-of-service (QoS) for applications installed in a communication device, the method comprising:
    receiving network usage measurements associated with a communication session that is conducted over a plurality of network communication layers, a first identifier of an application that executes on the communication device, a second identifier of the application, and a process name or a process identifier of the application, wherein the first identifier is associated with a first layer of the plurality of network communication layers, wherein the second identifier is associated with the first identifier and a second layer of the plurality of network communication layers, and wherein at least one of the process name or the process identifier is associated with the second identifier;
    determining network usage data, associated with the application, from the network usage measurements;
    determining, based on the determined network usage data, a QoS of the application; and
    providing the determined QoS of the application to the communication device,
    wherein receiving the network usage measurements includes receiving the network usage measurements from a mobile monitoring application (MMA) that executes on the communication device.

11. The method of claim 10, further comprising providing the determined QoS of the application to at least one of a telecommunication service provider and an application server.

12. The method of claim 10, wherein determining the QoS of the application comprises:
    selecting a utility function for the application; and
    generating the QoS based on the network usage data that utilizes the utility function.

13. The method of claim 10, wherein determining the QoS comprises determining the QoS by a monitoring function that executes on a server communicatively coupled to the communication device via a network.

14. The method of claim 10, wherein receiving the network usage measurements includes receiving bandwidth information, protocol, port, packet statistics, error information, and/or routing information associated with multiple applications that execute on the communication device.

15. A server configured to be communicatively coupled to a communication device over a network and further configured to determine quality-of-service (QoS) for applications installed in a plurality of communication devices, the server comprising:
    a communication interface configured to:
      receive network usage measurements associated with a communication session that is conducted over a plurality of network communication layers, a first identifier of an application that executes on a communication device of the plurality of communication devices, a second identifier of the application, and a process name or process identifier of the application, wherein the network usage measurements are received from a mobile monitoring application (MMA) that executes on the communication device, wherein the first identifier is associated with a first layer of the plurality of network communication layers, wherein the second identifier is associated with the first identifier and a second layer of the plurality of network communication layers, and wherein at least one of the process name or a process identifier is associated with the second identifier;
    a processor coupled to the communication interface and configured to:
      determine, from the received network usage measurements, network usage data associated with the application;
      determine, based on the determined network usage data, a QoS of the application; and
      provide, to the communication device via the communication interface, the determined QoS of the application; and
    a memory communicatively coupled to the processor and to the communication interface, and configured to store the received network usage measurements, the first identifier, the second identifier, the process name, the process identifier, and the QoS of the application.

16. The server of claim 15, wherein the processor is further configured to load QoS information from the plurality of communication devices, and aggregate the loaded QoS information.

17. The server of claim 15, wherein the processor is further configured to determine a time of launch of each of a plurality of applications that execute at a respective communication device of the plurality of communication devices.

18. The server of claim 17, wherein the processor is further configured to determine whether a correlation exists between the time of launch of each of the plurality of applications and a performance of the network.

19. The server of claim 15, wherein the processor is further configured to provide the determined QoS of the application to at least one of a telecommunication service provider and an application server.

20. A communication device, comprising:
    a memory configured to store collected network usage measurements that are associated with a network communication session that is conducted over a plurality of network communication layers, wherein the network usage measurements are received from a mobile monitoring application (MMA) that executes on the communication device; and a processor coupled to the memory and configured to perform or control performance of operations to:

process a portion of the network usage measurements, associated with a first layer of the plurality of network communication layers, to obtain a first identifier of an application that executes on the communication device;

obtain a second identifier of the application based on an association of the first identifier with the second identifier, wherein the second identifier is associated with a second layer of the plurality of network communication layers;

obtain a process name or process identifier of the application based on an association of the second identifier with at least one of the process name or the process identifier, wherein the process name or the process identifier is used to identify the application;

determine, based on the network usage measurements, network usage data associated with the application;

determine, based on the network usage data associated with the application, a QoS of the application; and provide the determined QoS of the application to the communication device.

21. The communication device of claim 20, wherein the memory is configured to store network usage measurements of the application that are collected at an application-level layer.

22. The communication device of claim 20, wherein the memory is configured to store network usage measurements of the application that are collected from a network communication layer.

23. The communication device of claim 20, wherein the network usage measurements comprise bandwidth information, protocol, port, packet statistics, error information, and/or routing information associated with multiple applications that execute on the communication device.

24. The communication device of claim 20, wherein the processor is configured to perform or control performance of an operation to, in response to an occurrence of a network communication exception, collect the network usage measurements based on the network communication exception.

* * * * *

UNITED STATES PATENT AND TRADEMARK OFFICE
CERTIFICATE OF CORRECTION

PATENT NO. : 10,085,178 B2
APPLICATION NO. : 15/489111
DATED : September 25, 2018
INVENTOR(S) : Van Den Bogaert Page 1 of 1

It is certified that error appears in the above-identified patent and that said Letters Patent is hereby corrected as shown below:

In the Specification

In Column 1, Line 12, please delete "tiling" and insert -- filing -- therefor.

In Column 9, Line 47, please delete "AIMS" and inset -- AEMS -- therefor.

In Column 11, Line 44, please delete "ALMS" and insert -- AEMS -- therefor.

Signed and Sealed this
Thirty-first Day of March, 2020

Andrei Iancu
*Director of the United States Patent and Trademark Office*